(12) United States Patent
Egan

(10) Patent No.: US 7,769,664 B2
(45) Date of Patent: Aug. 3, 2010

(54) GUARANTEED PRINCIPAL INVESTMENT SYSTEM, PRODUCT AND METHOD

(76) Inventor: George Egan, 3150 Hilltop Mall Rd., Richmond, CA (US) 94806

( * ) Notice: Subject to any disclaimer, the term of this patent is extended or adjusted under 35 U.S.C. 154(b) by 274 days.

(21) Appl. No.: 11/801,569

(22) Filed: May 10, 2007

(65) Prior Publication Data

US 2008/0281761 A1 Nov. 13, 2008

(51) Int. Cl.
*G06Q 40/00* (2006.01)
(52) U.S. Cl. .......................... 705/36 R; 705/35
(58) Field of Classification Search ............... 705/36 R, 705/35, 37, 38, 36 T, 4, 40, 39
See application file for complete search history.

(56) References Cited

U.S. PATENT DOCUMENTS

| | | | |
|---|---|---|---|
| 5,729,700 A | 3/1998 | Melnikoff | |
| 5,852,811 A | 12/1998 | Atkins | |
| 5,933,815 A | 8/1999 | Golden | |
| 6,125,355 A | 9/2000 | Bekaer | |
| 6,360,210 B1 | 3/2002 | Wallman | |
| 6,567,790 B1 | 5/2003 | Slane | |
| 6,578,016 B1 * | 6/2003 | Trankina et al. | 705/39 |
| 6,609,110 B1 | 8/2003 | Dowd | |
| 7,028,007 B1 | 4/2006 | Abrahams | |
| 7,031,938 B2 | 4/2006 | Fraivillig | |
| 7,050,998 B1 | 5/2006 | Kale | |
| 7,080,032 B2 | 7/2006 | Abbs | |
| 7,120,601 B2 | 10/2006 | Chen | |
| 7,127,423 B2 * | 10/2006 | Dunning et al. | 705/36 R |
| 2001/0014873 A1 | 8/2001 | Henderson | |
| 2002/0032627 A1 | 3/2002 | Perot | |
| 2002/0059123 A1 * | 5/2002 | Dunning et al. | 705/35 |
| 2002/0103852 A1 * | 8/2002 | Pushka | 709/203 |
| 2002/0174042 A1 * | 11/2002 | Arena et al. | 705/35 |
| 2002/0174046 A1 * | 11/2002 | Mistretta | 705/36 |
| 2002/0198809 A1 | 12/2002 | Daley | |
| 2003/0004849 A1 | 1/2003 | Velez | |
| 2003/0120575 A1 | 6/2003 | Wallman | |
| 2003/0172018 A1 | 9/2003 | Chen | |
| 2003/0187764 A1 | 10/2003 | Abbs | |
| 2003/0208426 A1 | 11/2003 | Rosenberg | |
| 2004/0024679 A1 | 2/2004 | Wallman | |

(Continued)

OTHER PUBLICATIONS

Schneider, Steven "Use SP annuities for longer term buys.(single premium annuities)" Jul. 21, 1997 National Underwriter Life & Health-Financial Services Edition, v101, n29, p. 13(2).*

(Continued)

*Primary Examiner*—Kelly Campen
(74) *Attorney, Agent, or Firm*—Matlock Law Group, PC

(57) ABSTRACT

A financial system with at least one equity profile, one or more non-guaranteed investment instruments and at least one target-risk profile to provide a return on an initial investment amount a portion of which includes at least a predetermined sum certain principal amount. In certain aspects, one or more processor readable storage devices having processor readable code embodied on said processor readable storage devices, said processor readable code for programming one or more processors to perform a method of providing an investment portfolio includes steps for providing a sum certain principal amount that includes at least a portion that is guaranteed and a portion that is non-guaranteed and earns an investor selected return.

25 Claims, 4 Drawing Sheets

U.S. PATENT DOCUMENTS

| | | |
|---|---|---|
| 2004/0098330 A1 | 5/2004 | Fraivillig |
| 2005/0027632 A1 | 2/2005 | Zeitoun |
| 2005/0060251 A1 | 3/2005 | Schwartz |
| 2005/0075976 A1 | 4/2005 | Woodruff |
| 2005/0108137 A1 | 5/2005 | Winkler |
| 2005/0187851 A1 | 8/2005 | Sant |
| 2005/0216316 A1* | 9/2005 | Brisbois et al. ............... 705/4 |
| 2005/0246260 A1* | 11/2005 | Hodgdon et al. ............. 705/36 |
| 2005/0283419 A1 | 12/2005 | Schaub |
| 2006/0111997 A1 | 5/2006 | Abbott |
| 2006/0116941 A1* | 6/2006 | Lombardo ................... 705/35 |
| 2006/0200400 A1 | 9/2006 | Hunter |
| 2006/0206401 A1 | 9/2006 | Abbs |
| 2006/0229964 A1* | 10/2006 | Fox ............................. 705/35 |
| 2006/0253356 A1 | 11/2006 | Charles |
| 2006/0282355 A1* | 12/2006 | Canezin et al. .............. 705/35 |
| 2007/0100726 A1* | 5/2007 | O'Flinn et al. ............ 705/36 R |
| 2007/0143199 A1* | 6/2007 | Stiff et al. ................. 705/36 R |
| 2008/0071697 A1* | 3/2008 | Midlam et al. ............ 705/36 R |
| 2008/0109341 A1* | 5/2008 | Stiff et al. ................. 705/36 R |

OTHER PUBLICATIONS

Koco, Linda "Union Central's 2nd indexed product—An EIUL"Sep 29, 1997 National Underwriter (Life/Health/Financial Services) v101n39 pp. 13, 24.*

Horwitz, Edward J "EIAs still provide competitive potential"Jan 11, 1999 National Underwriter (Life/Health/Financial Services) v103n2 pp. 13, 17.*

Kalai, A.; Vempala, S.; 'Efficient Algorithms for Universal Portfolios' Foundations of Computer Science, 2000, Procedings. $41^{st}$ Annual Symposium, Nov. 12-14, 2000, pp. 486-491.

Vacca, L; 'Managing Options Risk with Genetic Algorithms' Computational Intelligence for Financial Engineering (CIFEr), 1997 Proceedings of the IEEE/IAFE 1997, Mar. 24-25, 1977, pp. 29-35.

Blakey, P.; The False Allure of Equity Indexed Annuities; Source: *Microwave Magazine*, IEEE vol. 7, Issue 2, Apr. 2006, pp. 16-22.

Jay April, Fred Glover, James Kelly; Risk Analysis; Optquest Software Tutorial: Portfolio Optimization for Capital Investment Projects; Proceedings at the $34^{th}$ Conference on Winter Simulation; Exploring New Frontiers WSC/'02, Dec. 2002.

William J. Morokoff; Risk Analysis; Tutorial Portfolio Credit Risk Management; Tutorial on Portfolio Credit Risk Management; Proceedings of the $36^{th}$ Conference on Winter Simulation WSC/'04, Dec. 2004.

* cited by examiner

GUARANTEED PRINCIPAL INVESTMENT SYSTEM, PRODUCT AND METHOD

BACKGROUND

The subject matter herein relates generally to a system and method for providing investment products comprising a plurality of equity and index annuity portfolio allocations in a single insurance and securities investment product. Further, the subject matter also relates generally to a computer system and a web application wherein an investor selects the desired amount of investment principal to be guaranteed and a corresponding allocation of equity and equity-indexed annuity investments. Additionally the present disclosure relates to a system and method of selecting the amount of guaranteed investment principal with a corresponding equity and equity-index annuity portfolio allocation using a web application and computer system embodied therein. The present disclosure relates more specifically to investment principal guaranteed investment products and a method for determining specific amounts of investment principal guarantee with respect to a selected desired rate of return. More particularly, the present disclosure provides for an investment system with greater than none and about 100% of all investment principal guaranteed.

Annuities are well-known in the financial services industry. They are characterized by an accumulation phase and a payout phase. During the accumulation phase, the annuity owner makes one or more payments into the annuity account and the annuity account value fluctuates based on the performance of one or more predetermined investment selections. These investment selections may be made with money pooled from a plurality of said annuity accounts and may contain fixed return or variable rate investment products. During the payout phase, the annuity account value is returned to the annuity owner, often as part of an income plan wherein the annuity owner will receive a specified number of income payments for a predetermined time period based on the value of the annuity account.

Income plans are available in many forms. For example, the distributions may be made for a predetermined definite period, as in an annuity certain, or for as long as the person lives, as in a life annuity. Payments under a life annuity may terminate on the policy holder's death, as in a straight life annuity, or may continue to a beneficiary for a specified period after the policy holder's death, as in a life annuity with period certain. Alternatively, a life annuity may be based on two lives jointly, as in a joint and last-survivor annuity in which payments continue to be made to the survivor for the remainder of his or her life, or may provide a beneficiary a lump sum payment upon the death of the policy holder. The payments under an annuity may be set to begin on the purchase date of the annuity, as in an immediate annuity, or after a specified amount of time, as in a deferred annuity.

Annuities are typically conservative investments providing a low risk return on investment. By coupling annuities with equity or stock based investments, the total return to an investor may be more uncertain or erratic, depending on the allocation. However, one solution is an equity-indexed annuity which is also well known in the art. An equity-indexed annuity is linked to an index fund such as the Standard and Poors 500 Index (S&P 500). When the index fund increases in value, so does the value in the annuity account depending on the interest earnings of the annuity account. If the index fund drops in value, the principal amount in the annuity account is protected to a guaranteed minimum by a contract with an annuity provider such as a life insurance company. Loss of some principal is possible if the annuity is surrendered before the end of the term of the contract. One disadvantage of an annuity as described here is that there is no ability for the investor to determine the amount of the guaranteed principal. Instead, the investor selects a desired rate of return or the degree of risk. As a result, the amount of guaranteed principal is dependant on the selections therein.

Because the interest rate of a fixed annuity is locked for the guarantee period, investors feel disadvantaged if the prevailing interest rates available in alternative investment products increase during the guarantee period while the fixed annuity is locked in at a lower rate. For this reason, fixed annuities are not a desirable investment option for many consumers of investment products; the consumers fear being locked into an interest rate that may, during the guarantee period, be lower than prevailing interest rates available in other investment products. Variable annuities obviate this problem because the variable annuity is not locked into a guaranteed interest rate. Through a variable annuity, the investor can participate in bond, equity, and money markets and thereby reap the benefits of upturns in those markets. On the other hand, such investments involve more risk and volatility than guaranteed fixed annuities, and, in addition to reaping the benefits of upturns, the investor must suffer through downturns in the markets underlying the variable account as well. Accordingly, the variable annuities may not be desirable for some investors, especially investors operating under relatively short investment time horizons.

Therefore, a need exists for an investment system and method that provides a guaranteed principal amount, as in a fixed annuity, while offering the possibility of higher returns as found in a broad equity index fund.

SUMMARY

An investment system comprising at least one equity profile comprising one or more non-guaranteed investment instruments and at least one target-risk profile, wherein the target-risk profile and the investment equity profile provide a return on an initial investment amount, said return comprising at least a predetermined sum certain principal amount The construction and method of operation of the invention, together with additional objectives and advantages thereof, will be best understood from the following description of specific embodiments when read in connection with the accompanying drawings.

DESCRIPTION

Figure 1:
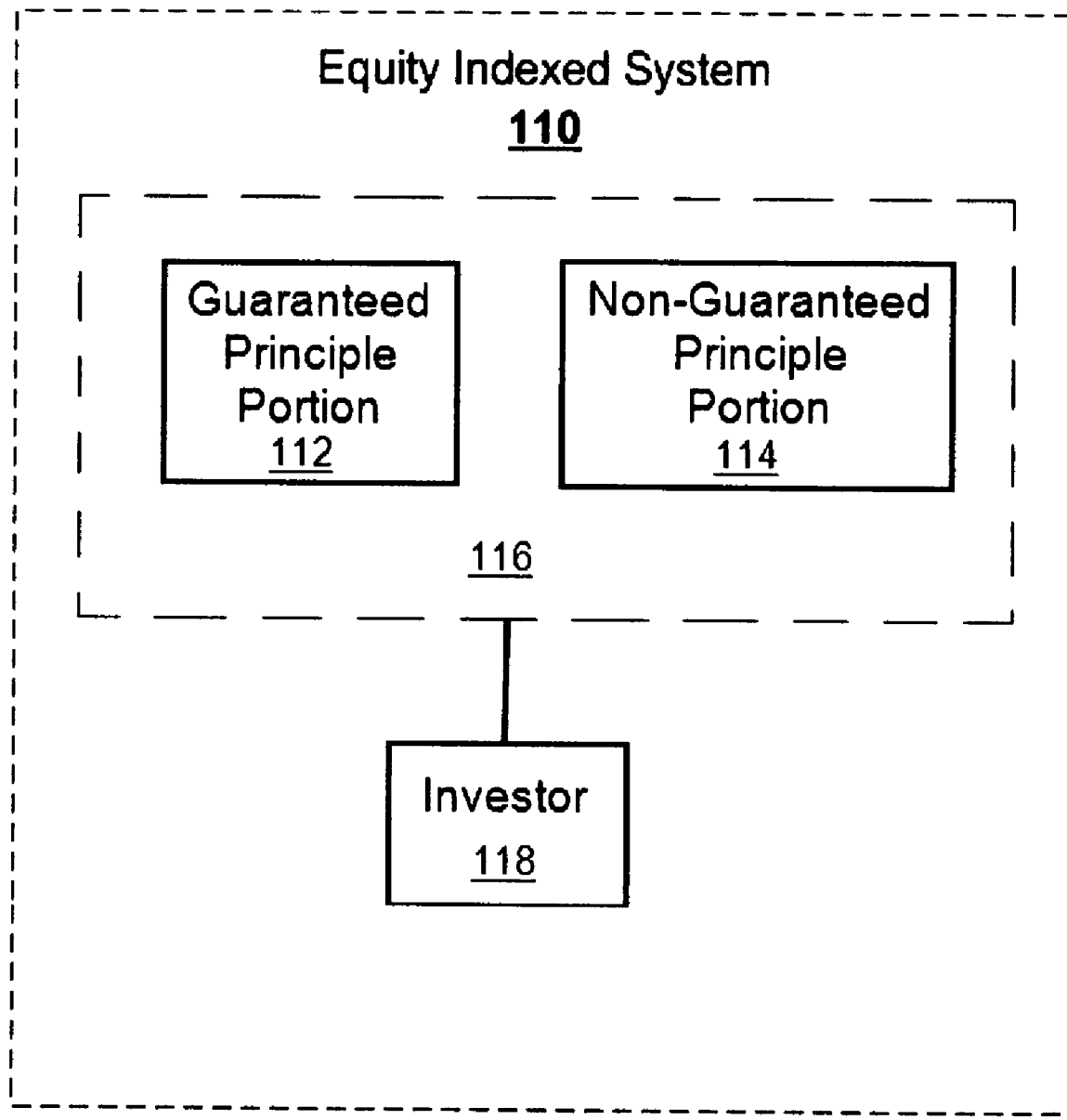
FIG. 1 is a high level block diagram of one embodiment of the guaranteed principal investment system of the current invention.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Investment firms and insurance companies often package investment instruments in differing combinations to provide easy to understand investment products to their clients. The investment products provide differing levels of risk and reward and are presented to clients based on their investment needs and risk tolerance. For example, as people retire they are more risk adverse and prefer investments which are more secure, such as annuities, instead of higher risk investments such as equities. The investment products are generally sold as part of a contract between the investor and a broker or insurance company. The contract sets terms and conditions required for the investment products.

FIG. 1 is a high level block diagram of one embodiment of the guaranteed principal investment system of the current invention 110. The equity index system 110 is comprised of one or more investment portfolios 116 and one or more investors 118. The investment portfolio 116 is further comprised of a guaranteed principal portion 112 and a non-guaranteed principal portion 114. The guaranteed principal portion 112 provides for a minimum amount of investment principal that is guaranteed to be returned to the investor. The guaranteed principal amount may be selected by an investor and sets the minimum amount of principal the investment maintains. In this embodiment the guaranteed principal portion 112 is comprised of a contract with an investment firm or insurance company wherein the contract provider guarantees the principal amount. Such a portfolio may be based on at least one annuity, savings bond or other form of investment that provides a guaranteed principal. In this embodiment the guaranteed performance provides for a sum certain principal amount.

The non-guaranteed principal portion 114 is an investment portfolio comprised of equities and other investments that do not provide a guaranteed principal. These are one or more stocks, bonds or other investment instruments not supported by a contract to provide a guaranteed amount. Together the guaranteed principal portion 112, the non-guaranteed principal portion 114 provide an investment portfolio 116 that provides a return to the investor 118 such that an investor 118 gains the benefit of a predetermined fixed guaranteed principal to protect against principal losses and the benefit of equity market performance in a single investment instrument.

The guaranteed principal portion 112 is comprised of one or more annuities or other investments where at least a portion of the investment is assured to be returned to the investor. These annuities may be from a single annuity contract with an insurer or from a collection of multiple annuities from differing sources. Also the differing annuities may be tax exempt annuities or combinations of tax exempt and non tax-exempt annuities. The annuities may be held in tax deferred accounts such as individual retirement accounts (IRAs) or non tax deferred accounts or any combination thereof.

The non-guaranteed principal portion 114 is comprised of one or more non-guaranteed investment instruments such as mutual funds, exchange traded funds, individual stocks, commodities, options and other instruments suitable to the investor. The non-guaranteed principal portion 114 may also contain equity indexed annuities or combinations of equity indexed annuities and non-guaranteed investment instruments. The non-guaranteed principal portion 114 may be comprised of tax deferred instruments and may be held in tax deferred accounts such as individual retirement accounts (IRAs) or non tax deferred accounts or any combination thereof.

A non-guaranteed investment instrument is any investment where a minimum return on the investment is not assured. Although stocks and mutual funds are presented here, one having skill in the art would recognize that other, more varied investments may be employed in keeping with the spirit of the present invention. Likewise other investments besides annuities may provide a guaranteed principal to the investor.

The investor 118 selects and investment portfolio based on the investor's 188 risk tolerance. It is within the scope and spirit of the current invention to prepackage differing guaranteed principal portions 112 and non-guaranteed principal portion 114 to meet the requirements of differing investors. For example, an investment instrument 116 may be comprised of a guaranteed principal portion 112 that is one or more annuities and a non-guaranteed principal portion 114 that is comprised of one or more "blue chip" stocks. This would provide and investment instrument 116 that is preferable for people who are risk adverse. As another example the investment instrument 116 may be comprised of a guaranteed principal portion 112 that is one or more indexed based annuities and a non-guaranteed principal portion 114 that is comprised of one or more technology stocks. This would provide and investment instrument 116 that is preferable for people who are willing to take more risk. The current invention provides for packaging differing investments together and providing to investors differing investment instruments to meet investor 118 risk profiles. In addition to packaging differing investments together, the current invention may be customized on a per investor 118 basis.

Figure 2:
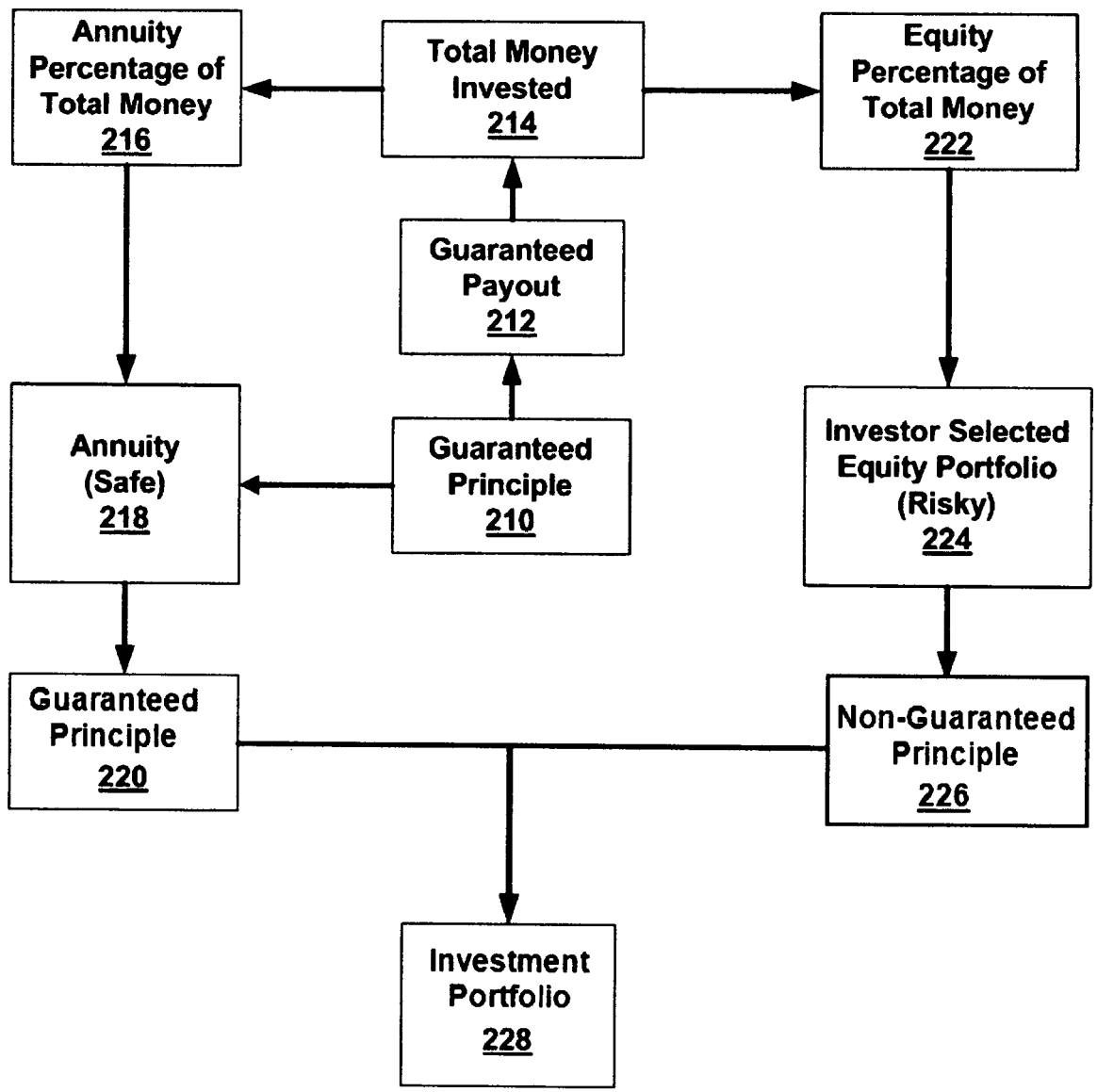
FIG. 2 is an exemplary block diagram illustrating the management of the guaranteed principal investment system of the present invention.

FIG. 2 is an exemplary block diagram illustrating one embodiment of the guaranteed principal investment system 110 of the present invention. The first step is to determine the guaranteed principal 210 which may be specified by an investor or predetermined as part of a standard investment product. Next the guaranteed payout 212 and total money invested 214 is established. The total money invested 214 is split into two portions. A first portion, usually expressed as a percentage, of total money 216 is directed towards annuities 218 while a second portion 222 is directed to an investor selected equity portfolio 224. The income produced by the annuity 218 provides a guaranteed principal portion 220 which is combined with the non-guaranteed portion 226 from the investor selected equity portfolio 224 to produce an investment portfolio 228.

One having skill in the art will recognize that the operations described above may be investor selected or predetermined by the contract offeror. Additionally combinations of investor selected or predetermined operations may be created that maintain the spirit of the current invention. Also the investor may at times reallocate the percentage of total money invested 214 into differing portions of annuity percentage 216 and equity percentage 222 investments. Finally although this embodiment shows an annuity for generating a guaranteed principal amount, the invention may practiced using other guaranteed principal contracts besides an annuity.

The benefit of this embodiment of the present invention is that an investor may gain the advantages of a guaranteed principal amount combined with the advantage of a variable rate of return investment instrument. Another advantage is that as market conditions change, the percentage of money in high risk investments may be reallocated to lower risk investments and vice versa. A third advantage is that the investor may allocate money or portions of money into or out of tax deductible investment instruments thus tailoring an investment based on an investor's financial needs. The wide variety of taxable, tax deferred, principal guarantee and tax free investments provides a unique choice for the investor in a manner much easier than previous investment systems.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Figure 3:
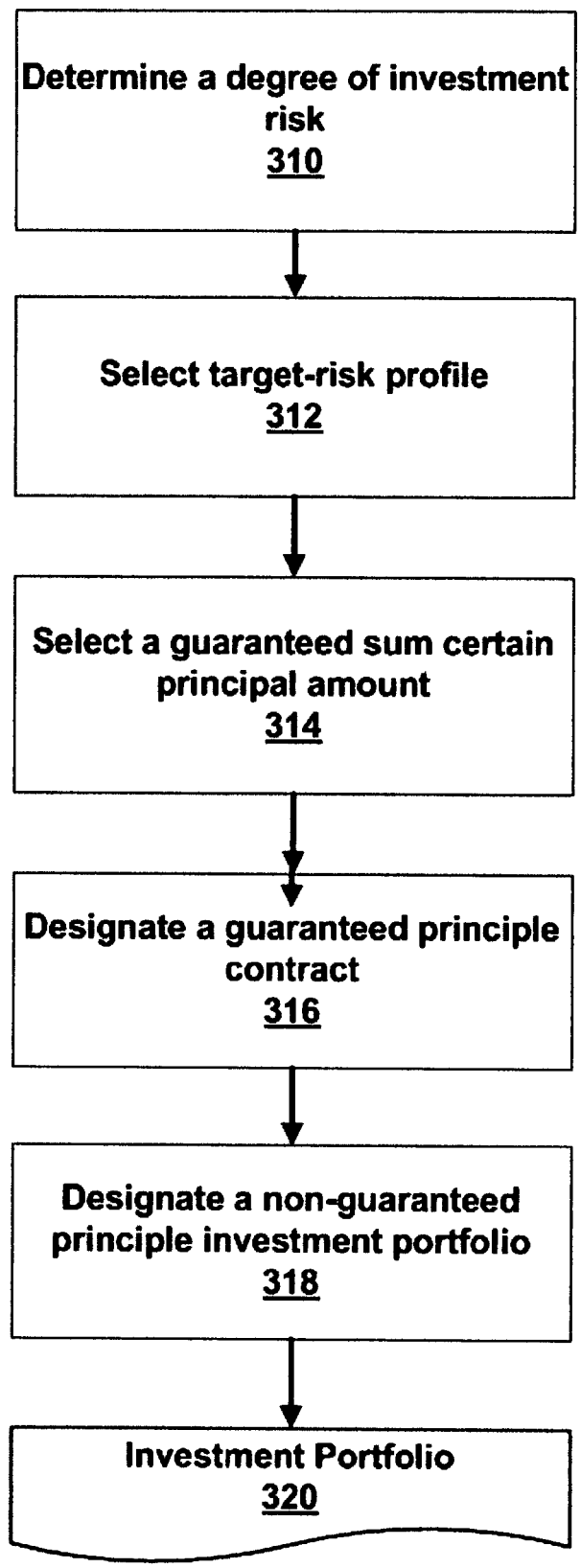
FIG. 3 shows a flowchart detailing the steps necessary to effect one embodiment of the current invention.

FIG. 3 shows a flowchart detailing the steps necessary to effect one embodiment of the current invention. Although the flowchart of FIG. 3 shows one series of steps, the steps may be performed in any order. The first step comprises determining a degree of investment risk 310 based on investor preferences. A high degree of investment risk would place a substantial portion of the total investment in high risk, but high yield, investment instruments. Secondly selecting a target-risk profile 312 comprised of differing prepackaged investment instruments wherein certain investments are combined to meet the needs of the investor based on investment risk. A guaranteed sum certain principal percentage 314 is selected which provides for a predetermined amount which the investment contract must pay as a percentage of a principal amount. Once the degree of risk is established, a guaranteed principal contract 316 and a non-guaranteed investment 318 are established.

The method of FIG. 3 results in a portfolio that provides return to the investor comprising a first portion which is a sum certain principal amount of less than an initial investment, and a second portion which is based on a market rate of return from the target-risk profile. The portfolio may also provide for a degree of investment risk and a desired contract holding period so that regular income payments can be made to an investor.

Figure 4:
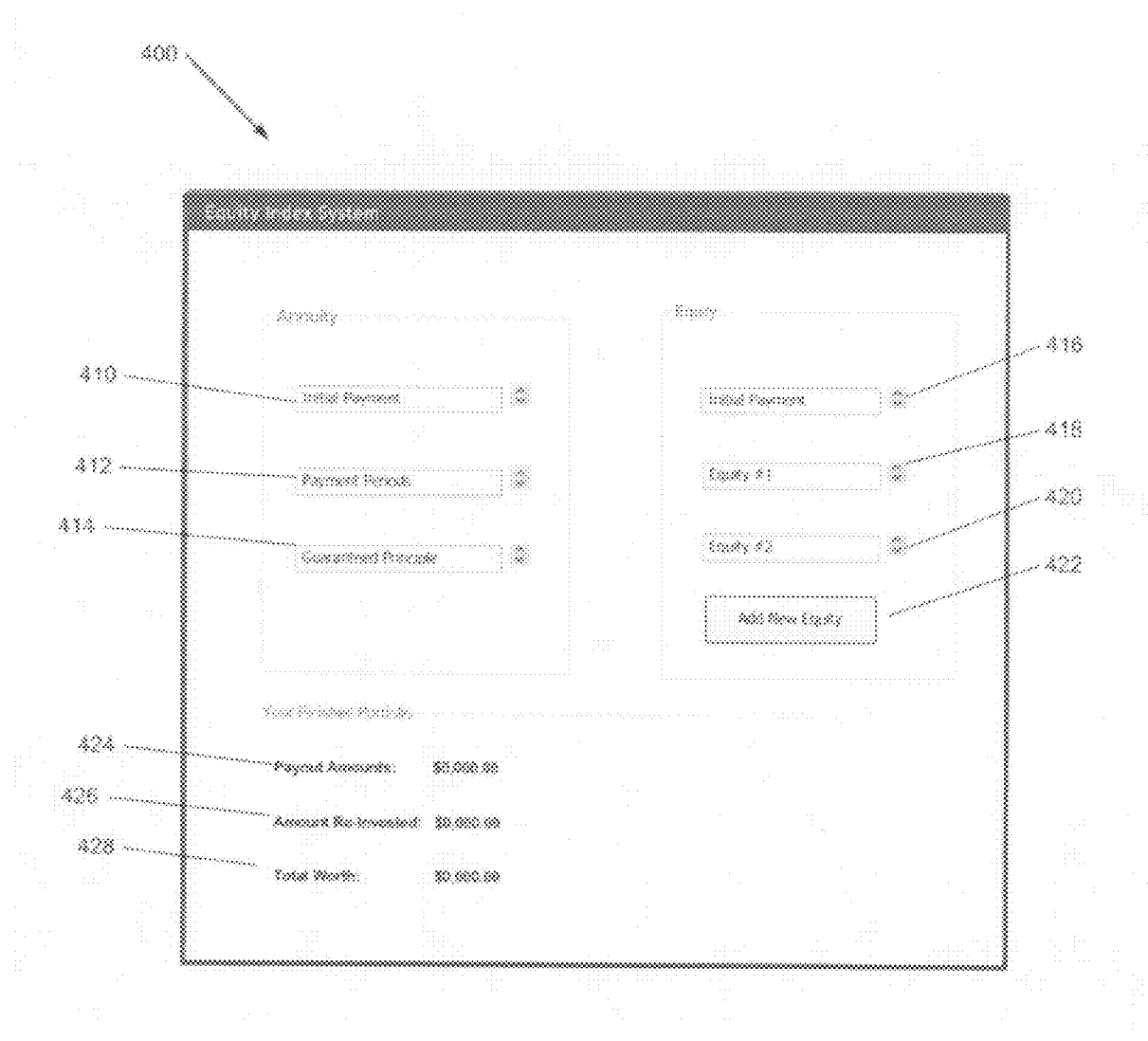
FIG. 4 depicts one possible user interface for a computer-based system for implementing one embodiment of the current invention.

FIG. 4 depicts one possible user interface 400 for a computer-based system for implementing one embodiment of the current invention. This embodiment comprises an annuity information screen area 430 for entering annuity information, an equity information screen area 432 for selecting equities and a finished portfolio display screen area for displaying the results of the portfolio. In this embodiment the guaranteed principal portion is based on an annuity; however it could be implemented using other guaranteed principal contracts. In the annuity screen area 430 an initial payment 410 is entered along with the desired payment periods 412 and a guaranteed principal 414. Under the equity screen area 432 an initial payment 416 is entered along with a list of equities. For example equity #1 418 and equity #2 420. The Add New Equity button 422 allows a user to add more equities to the equity screen area 432. Once the annuity and equity screen area are completed, payout amounts 424, amount re-invested 426 and total worth 428 are displayed in a finished portfolio screen area 434. The payout amounts 424, amount reinvested 426 and total worth 428 may be calculated based on the earnings of the total investment over the lifetime of the investment.

The user interface of FIG. 4 may allow the user to change certain settings during the lifetime of the investment. For example, if the investment provides earnings, those earning can be directed towards new or differing investment options. New equities could be added to the system or a different guaranteed principal could be specified. Additionally, the user interface may be constructed to provide for allocating funds between tax exempt and non tax exempt investments (not shown).

Certain reset features might be included to change the sum certain guaranteed principal target risk profile and other settings based on the earnings of the system (not shown). The reset functions could be implemented annually, monthly or at other intervals as desired thus providing a means for an investor to gain from market advances or to reduce risk in poor performing markets.

The user interface of FIG. 4 may include optional control (not shown) for specifying the degree of risk. The degree of risk, together with the guaranteed principal amount 424, indicates an investor risk profile that characterizes the investor's risk adversity. The investor risk profile may be used to limit the available investment selections to instruments consistent with the investor risk profile. For example a highly risk adverse investor may only be able to choose investments from more conservative investment options.

The user interface of FIG. 4 may be implemented on a personal computer (PC) or on a computer connected as a network server. One having skill in the art would recognize that the current invention may be implemented using standard software including but not limited to Java, HIML, C, Visual Basic and other programming languages. One having skill in the art would also recognize that the software may be implemented using algorithms, routines and procedures known in the art for effecting financial service computer code. The software may be encoded or otherwise embodied on processor readable storage devices such as hard drives and memory modules for operating a computer or other electronic device.

Input and display of the current invention may be implemented on common displays and keyboards, personal digital assistants (PDAs), mobile communications devices and other electronic hardware with input and display capabilities. Additionally displays of amounts, portfolios and/or profiles include graphs and charts as well as computer generated reports for printing and/or publishing.

In another embodiment, a method is disclosed that provides an investment system that allocates a pre-determined amount of investment dollars into a unique equity driven market return portfolio, and provides an end user investor of said equity driven market return portfolio the choice to pre-determine an amount of investment to be principal guaranteed using the flexible interest choices.

In yet another aspect of the invention, provided in the index annuity portion of said method, the portfolio may provide 100% market driven returns to investor with a flexible interest feature of the index annuity combined with various equity choices without a guarantee of principal. This feature to guarantee principal and receive a flexible interest return is demonstrated by a formula that is driven by equity market performance.

The guarantee of principal provided with said method is unique to equity based portfolio design. Using this method of principal guarantee to reduce the risk of loss inherent in equity investments, the reduced volatility may reduce deviation to the portfolio and increase the predictability of returns. With market driven returns provided from the unique feature of index flexible interest, the remaining portion of investment may be apportioned into equity and or debt investment choices providing conventional non-guaranteed principal returns. The reduced risk feature of method may provide institutional programs the stability needed to forecast future funding obligations.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An investment system, comprising a processor operable to execute instructions contained in computer program code and at least one computer readable medium including one or more processor readable storage devices having processor readable code embodied on said processor readable storage devices, said processor readable code for programming one or more processors for implementing:
   a plurality of combination investment portfolio products,
   a plurality of target risk profiles,
   at least one non-guaranteed investment portion associated with at least one investment portfolio product;
   at least one guaranteed investment portion per combination investment portfolio product wherein said guaranteed and non-guaranteed investment portions comprise a fixed allocation combination investment portfolio product and wherein said at least one of the guaranteed investment portions is comprised of one or more annuities and wherein said one or more annuities includes at least one equity indexed annuity; and
   a reset code module for providing a reset function such that the processor calculates a time based investment performance for displaying on the input/output module, said reset code module further controlling one or more of the following items selected from the group consisting of the guaranteed principal amount, the guaranteed investment, the non-guaranteed investment, or a payout period wherein the user changes the parameters of the system.

2. The investment system of claim 1 wherein a non-guaranteed investment portion is coupled with a guaranteed principal investment portion to provide a return on an initial investment amount, said return comprising at least a predetermined sum certain principal amount.

3. The investment system of claim 2 wherein the non-guaranteed investment portion further comprises:
   at least one equity-indexed annuity;
   a reset code module for providing a reset function such that the processor calculates a time based investment performance for displaying on the input/output module, said reset code module further controlling one or more of the following items selected from the group consisting of the guaranteed principal amount, the guaranteed investment, the non-guaranteed investment, or a payout period wherein the user changes the parameters of the system;
   a plurality of equity and index annuity portfolio allocations in a single insurance and securities investment product; and
   an investment system with greater than none and about 100% of all investment principal guaranteed.

4. The investment system of claim 1, further comprising:
   a plurality of target risk profiles coupled with the combination investment portfolio product comprising said investment portfolio products and a guaranteed principal investment portion coupled with a non-guaranteed investment portion to provide a return on an initial investment amount, said return comprising at least a predetermined sum certain principal amount.

5. The investment system of claim 1, further comprising:
   at least one non-guaranteed principal investment portion; and
   at least one guaranteed principal investment portion, wherein the guaranteed principal investment portion coupled with the non-guaranteed principal investment portion provides an enhanced market return on an initial investment amount, said return comprising at least a predetermined sum certain principal amount.

6. The investment system of claim 1, further comprising:
   a plurality of investment portfolio products,
   a plurality of target risk profiles, and
   a plurality of said combination investment portfolio products coupled with said target risk profiles wherein the investment system equals a fixed portfolio to provide ease of investment selection.

7. The investment system of claim 1 wherein the guaranteed investment portion comprises one or more annuities.

8. The investment system of claim 1 wherein the non-guaranteed investment portion comprises one or more of the following: a mutual fund, an exchange traded fund, an individual stock, a commodity or a stock option.

9. The investment system of claim 1 further comprising:
   one or more investor selected total investment amounts;
   one or more investor selected percentages of guaranteed principal; and
   one or more investor selected guaranteed principal annuities.

10. The investment system of claim 1 wherein the guaranteed sum certain principal is greater than zero and less than the initial investment.

11. A computer implemented method including computer-readable storage medium having computer-readable program code embodied therein for causing a computer system to perform a method of providing an investment portfolio comprising the following steps in any order:
    providing, by the computer system, at least one non-guaranteed investment;
    providing, by the computer system, at least one guaranteed investment;
    selecting, by the computer system, a degree of investment risk;
    providing, by the computer system, a guaranteed sum certain principal percentage,
    wherein the investment portfolio provides a market rate of return amount and a sum certain principal amount, said sum certain principal amount being less than an initial investment amount and wherein said at least one of the guaranteed investments is comprised of one or more annuities and wherein said one or more annuities includes at least one equity indexed annuity; and
    providing, by the computer system, a reset code module for providing a reset function such that the processor calculates a time based investment performance for displaying on the input/output module, said reset code module further controlling one or more of the following items selected from the group consisting of the guaranteed principal amount, the guaranteed investment, the non-guaranteed investment, or a payout period wherein the user changes the parameters of the system.

12. The method of claim 11 wherein the non-guaranteed investment comprises one or more of the following: a mutual fund, an exchange traded fund, an individual stock, a commodity or a stock option.

13. The method of selecting an investment portfolio of claim 11, further comprising the following steps in any order:
- determining, by the computer system, a percentage guarantee based on a guaranteed principal portion of a total investment amount;
- relating, by the computer system, the percentage guarantee to at least one degree of risk;
- determining, by the computer system, an investor risk profile based on the at least one degree of risk and the guaranteed principal;
- displaying, by the computer system, the investor profile;
- providing, by the computer system, one or more sum certain guaranteed principal investment portions correlating to the investor profile; and
- providing, by computer system, one or more non-guaranteed investment portions based on the investor profile, wherein the investment portfolio calculates an allocation based on the degree of risk, said allocation comprising a first portion of a sum certain guaranteed principal and a second portion of a non-guaranteed investment return.

14. The method of claim 13 wherein displaying the investor profile comprises displaying a graph or chart on an electronic video display.

15. The method of claim 13 wherein the sum certain principal investment comprises one or more annuities.

16. The method of claim 13 wherein the non-guaranteed principal investment comprises of one or more of the following: a mutual fund, an exchange traded fund, an individual stock, a commodity or a stock option.

17. A system including a processor operable to execute instructions contained in computer program code and at least one computer readable medium and one or more processor readable storage devices having processor readable code embodied on said processor readable storage devices, said processor readable code for programming one or more processors to perform a method of providing an investment portfolio comprising the following steps:
- providing at least one non-guaranteed investment;
- providing at least one sum certain guaranteed principal initial investment amount;
- selecting a degree of investment risk; and
- selecting a guaranteed sum certain principal percentage,
- selecting at least one initial investment amount;
- providing a sum certain guaranteed principal market rate of return amount;
- calculating a sum certain principal return amount by multiplying said guaranteed sum certain principal market rate of return by the at least one initial investment amount, wherein said sum certain principal return amount is less than the total initial investment amount and wherein said at least one of the sum certain guaranteed principal initial investment amounts is comprised of one or more annuities and wherein said one or more annuities includes at least one equity indexed annuity;
- a plurality of equity and index annuity portfolio allocations in a single insurance and securities investment product; and
- an investment system with greater than none and about 100% of all investment principal guaranteed.

18. The system of claim 17 wherein the non-guaranteed investment comprises one or more of the following: a mutual fund, an exchange traded fund, an individual stock, a commodity or a stock option.

19. The system of claim 17 wherein the processor is connected to a computer network.

20. The system of claim 17 wherein the input/output module comprises one or more of the following: a computer monitor, a PDA or a wireless communications device.

21. The system of claim 17 wherein the user interface is an Internet browser.

22. The system of claim 17 wherein the input/output module further displays one or more of the following: an investment portfolio, an equity security, an equity index annuity fund, and a non-guaranteed portion.

23. The system of claim 17 wherein the input/output module further displays a current principal amount in excess of the guaranteed principal amount, a current investment amount, and a current rate of return interest rate.

24. The system of claim 17 further comprising:
- a reset code module for providing a reset function such that the processor calculates a time based investment performance for displaying on the input/output module.

25. The system of claim 24 wherein the reset code module controls one or more of the following: the guaranteed principal amount, the guaranteed investment, the non-guaranteed investment or a payout period wherein the user changes the parameters of the system.

* * * * *